US012684254B2

(12) United States Patent
Kim et al.

(10) Patent No.:  US 12,684,254 B2
(45) Date of Patent:  Jul. 14, 2026

(54) INSPECTION APPARATUS AND METHOD OF INSPECTING DISPLAY SUBSTRATE USING THE SAME

(71) Applicant: Samsung Display Co., LTD., Yongin-si (KR)

(72) Inventors: Myoungchul Kim, Yongin-si (KR); Taejun Kim, Yongin-si (KR); Tae-Gu Kang, Yongin-si (KR); Gunyoung Park, Yongin-si (KR); Jihoon Seo, Yongin-si (KR); Moonsung Choi, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/905,779

(22) Filed: Oct. 3, 2024

(65) Prior Publication Data

US 2025/0184622 A1  Jun. 5, 2025

(30) Foreign Application Priority Data

Nov. 30, 2023  (KR) ........................ 10-2023-0170452

(51) Int. Cl.
*H04N 23/90*  (2023.01)
*G01M 11/02*  (2006.01)
(Continued)

(52) U.S. Cl.
CPC ........ *H04N 23/90* (2023.01); *G01M 11/0278* (2013.01); *G01N 21/94* (2013.01); *H04N 23/695* (2023.01)

(58) Field of Classification Search
CPC . H04N 23/90; H04N 23/695; G01M 11/0278; G01N 21/94
(Continued)

(56) References Cited

U.S. PATENT DOCUMENTS 4,597,665 A  *  7/1986  Galbraith .................. G01J 1/04
                                              356/239.8
7,421,110 B2     9/2008  Nakano et al.
(Continued)

FOREIGN PATENT DOCUMENTS

EP           3401672 B1 *  8/2023  ......... G01N 21/8851
JP        2004259228 A     9/2004
(Continued)

*Primary Examiner* — Justin W Rider
(74) *Attorney, Agent, or Firm* — CANTOR COLBURN LLP

(57) ABSTRACT

An inspection apparatus includes: a stage on which a display substrate having a plurality of cell regions and a boundary region adjacent to the plurality of cell regions is seated and a plurality of photographing units which photograph the display substrate. The plurality of photographing units may include a first photographing unit which photographs a first photographing region of the display substrate and a second photographing unit which photographs a second photographing region adjacent to the first photographing region of the display substrate, the first photographing unit is capable of independently adjusting the first photographing region and the second photographing units is capable of independently adjusting the second photographing region, and a boundary of the first photographing region and a boundary of the second photographing region overlap the boundary region in a plan view.

19 Claims, 14 Drawing Sheets

(51) Int. Cl.
  G01N 21/94        (2006.01)
  H04N 23/695     (2023.01)

(58) Field of Classification Search
  USPC ........................................................ 348/125
  See application file for complete search history.

(56)                    References Cited

U.S. PATENT DOCUMENTS

| | | | |
|---|---|---|---|
| 10,203,289 | B2 | 2/2019 | Postolov et al. |
| 11,113,803 | B2 * | 9/2021 | Saphier ................ G01N 21/956 |
| 2012/0242984 | A1 * | 9/2012 | Fujihara ................. G01N 21/94 |
| | | | 356/237.4 |

FOREIGN PATENT DOCUMENTS

| | | | |
|---|---|---|---|
| JP | 2005024565 | A | 1/2005 |
| JP | 2013130529 | A | 7/2013 |
| KR | 20080075491 | A | 8/2008 |
| KR | 1020140006582 | A | 1/2014 |
| KR | 1020150092421 | A | 8/2015 |
| KR | 1020210152075 | A | 12/2021 |

* cited by examiner

FIG. 5

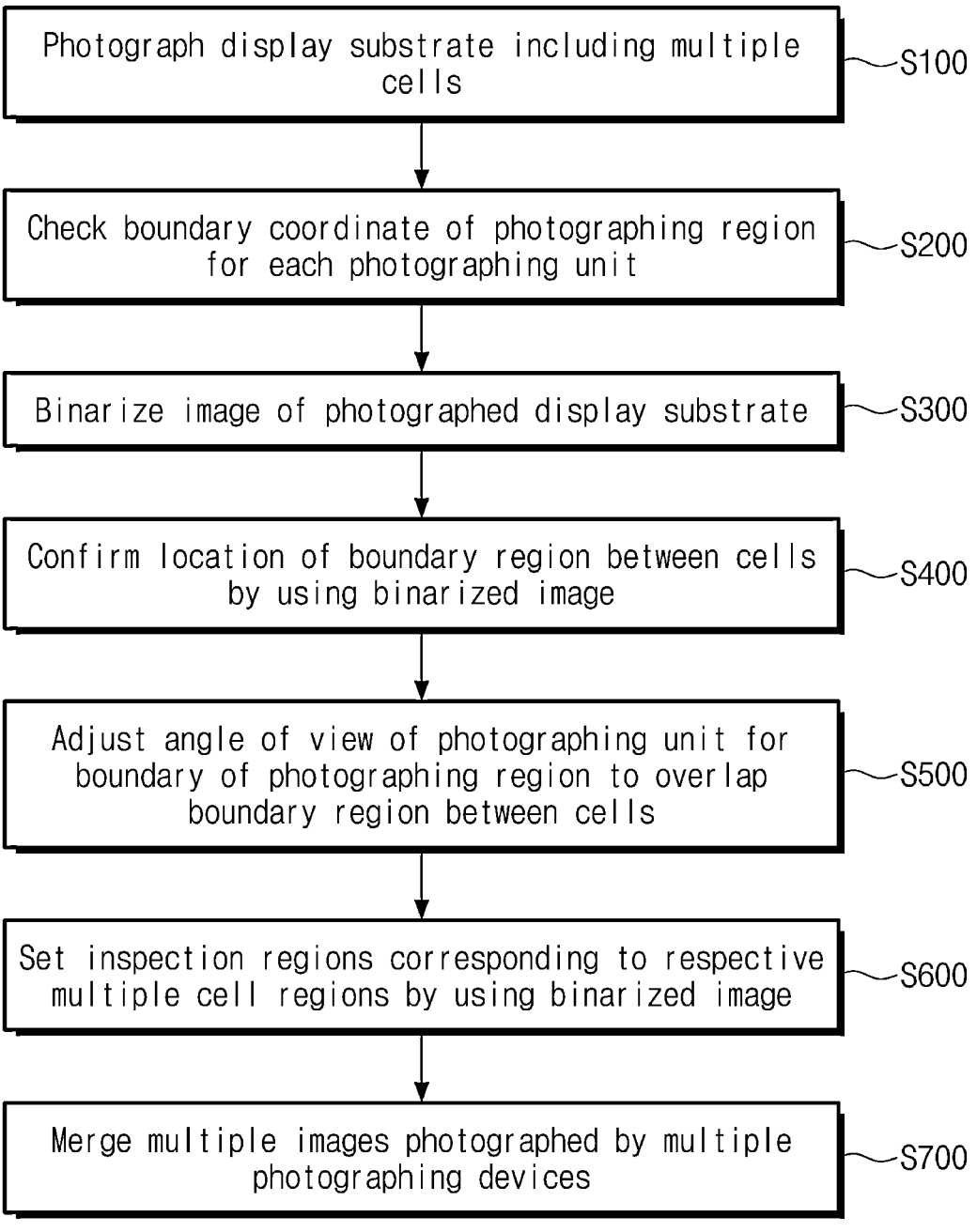

Photograph display substrate including multiple cells ⎯S100

Check boundary coordinate of photographing region for each photographing unit ⎯S200

Binarize image of photographed display substrate ⎯S300

Confirm location of boundary region between cells by using binarized image ⎯S400

Adjust angle of view of photographing unit for boundary of photographing region to overlap boundary region between cells ⎯S500

Set inspection regions corresponding to respective multiple cell regions by using binarized image ⎯S600

Merge multiple images photographed by multiple photographing devices ⎯S700

INSPECTION APPARATUS AND METHOD OF INSPECTING DISPLAY SUBSTRATE USING THE SAME

This application claims priority to Korean Patent Application No. 10-2023-0170452, filed on Nov. 30, 2023, and all the benefits accruing therefrom under 35 U.S.C. § 119, the content of which in its entirety is herein incorporated by reference.

BACKGROUND

The present disclosure herein relates to an inspection apparatus and a method of inspecting a display substrate using the same, and more particularly, to a display device including a plurality of photographing units.

Various inspection apparatuses may be used for inspecting a display device. Among such apparatuses, an optical inspection apparatus may inspect a display device using a camera. For example, the optical inspection apparatus may inspect short-circuit defects, open defects, or presence/absence of fine particles in several micrometers to dozens of micrometers. In addition, the optical inspection apparatus may inspect the presence/absence of foreign matters or residual films in hundreds of micrometers or more.

SUMMARY

The present disclosure provides an inspection apparatus in which the reliability in defect determination is improved.

The present disclosure also provides a method of inspecting a display substrate using an inspection apparatus in which the reliability in defect determination is improved.

An embodiment of the invention provides an inspection apparatus including a stage on which a display substrate having a plurality of cell regions and a boundary region adjacent to the plurality of cell regions is seated and a plurality of photographing units which photograph the display substrate, where the plurality of photographing units include a first photographing unit which photographs a first photographing region of the display substrate and a second photographing unit which photographs a second photographing region adjacent to the first photographing region of the display substrate, the first photographing unit is capable of independently adjusting the first photographing region and the second photographing unit is capable of independently adjusting the second photographing region, and a boundary of the first photographing region and a boundary of the second photographing region overlap the boundary region in a plan view.

In an embodiment, the boundary of the first photographing region and the boundary of the second photographing region may not overlap the plurality of cell regions in the plan view.

In an embodiment, the first photographing region and the second photographing region may be changed depending on an arrangement of the plurality of cell regions of the display substrate.

In an embodiment, the plurality of photographing units may be arranged in a first direction, and the first photographing region and the second photographing region may each extend in a second direction crossing the first direction.

In an embodiment, the plurality of photographing units may move along the second direction.

In an embodiment, the display substrate may move along the second direction.

In an embodiment, a size of the first photographing region may be different from a size of the second photographing region.

In an embodiment, the inspection apparatus according to an embodiment of the invention may further include an image processing unit connected to the plurality of photographing units to binarize a photographed image.

In an embodiment, the inspection apparatus according to an embodiment of the invention may further include a control unit which is connected to the plurality of photographing units, and which determines the boundary region by using the binarized image and adjusts angles of view of the plurality of photographing units such that the boundaries of the first and the second photographing regions each overlap the boundary region in the plan view.

In an embodiment, the first photographing region and the second photographing region may overlap each other in the boundary region in the plan view.

In an embodiment, the control unit may use the binarized image to set an inspection region based on an outermost location of each of the plurality of cell regions which are detected.

In an embodiment of the invention, a method of inspecting a display substrate, the method includes photographing, by a plurality of photographing units, the display substrate having a plurality of cell regions and a boundary region adjacent to the plurality of cell regions, binarizing an image of the photographed display substrate, confirming a location of the boundary region between the plurality of cell regions by using the binarized image, and adjusting an angle of view of each of the plurality of photographing units such that boundaries of photographing regions photographed by the plurality of photographing units each overlap the boundary region in a plan view.

In an embodiment, the plurality of photographing units may include a first photographing unit which photographs a first photographing region of the display substrate, and a second photographing unit which photographs a second photographing region adjacent to the first photographing region of the display substrate, and the first photographing unit is capable of independently adjusting the first photographing region and the second photographing units may be capable of independently adjusting the second photographing region.

In an embodiment, the boundaries of the photographing regions may not overlap the plurality of cell regions in the plan view.

In an embodiment, the plurality of photographing units may be arranged in a first direction, the plurality of photographing units may move in a second direction crossing the first direction, the display substrate may move in the second direction, and the plurality of photographing units may photograph the display substrate.

In an embodiment, in the binarizing of the image of the photographed display substrate, bright pixels having a brightness higher than a threshold value, among pixels of the image of the display substrate, may all be represented as a first color, and dark pixels having a brightness lower than the threshold value, among the pixels of the image of the display substrate, may be represented as a second color which is different from the first color.

In an embodiment, the method of inspecting the display substrate according to an embodiment of the invention may further include setting, by using the binarized image, an inspection region based on an outermost location of each of the plurality of cell regions which are detected.

In an embodiment, the method of inspecting the display substrate according to an embodiment of the invention may further include merging a plurality of images which are photographed by the plurality of photographing units.

In an embodiment, the plurality of images may overlap each other in the boundary region in the plan view.

In an embodiment, the photographing regions of the plurality of photographing units may each be changed depending on an arrangement of the plurality of cell regions of the display substrate.

BRIEF DESCRIPTION OF THE FIGURES

The accompanying drawings are included to provide a further understanding of the invention, and are incorporated in and constitute a part of this specification. The drawings illustrate embodiments of the invention and, together with the description, serve to explain principles of the invention. In the drawings:

FIG. 5 is a flowchart of a method of inspecting a display substate according to an embodiment of the invention;

DETAILED DESCRIPTION

Figure 1A:
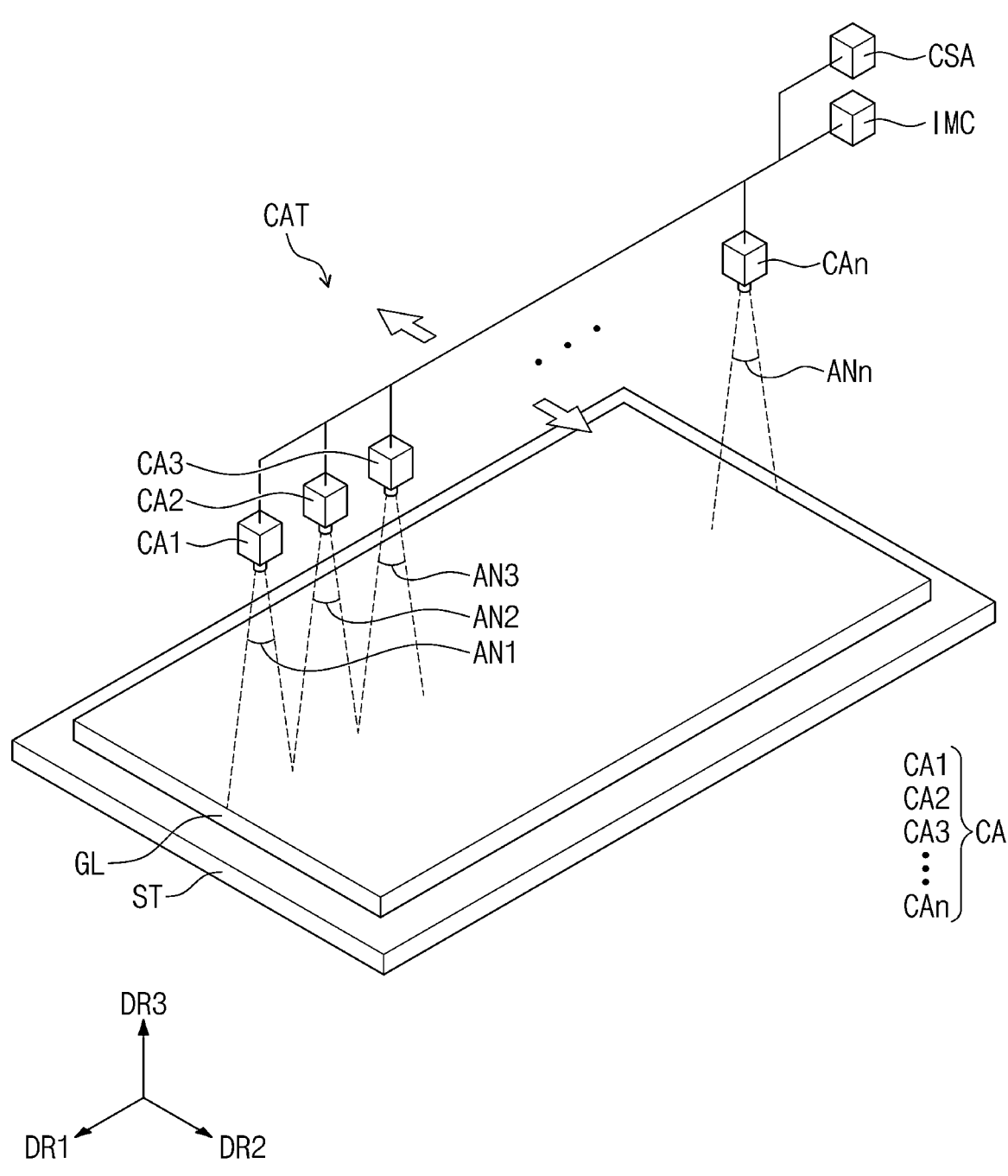
FIG. 1A is a perspective view of an inspection apparatus according to an embodiment of the invention.

In this specification, it will be understood that when a component (or a region, layer, portion, etc.) is referred to as being "on", "connected to" or "coupled to" another component, it can be directly on/connected/coupled to the other component or intervening component may be present.

Like reference numerals or symbols refer to like elements throughout. In addition, in the drawings, the thickness and the ratio and the dimension of the element are exaggerated for effective description of the technical contents. As used herein, the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. For example, a first element, component, region, layer or section discussed below could be termed a second element, component, region, layer or section without departing from the teachings of the invention. As used herein, the singular forms, "a", "an" and "the" are intended to include the plural forms as well, unless the context clearly indicates otherwise.

In addition, spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present disclosure belongs. In addition, it will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the invention will be described with reference to the accompanying drawings.

Figure 1B:
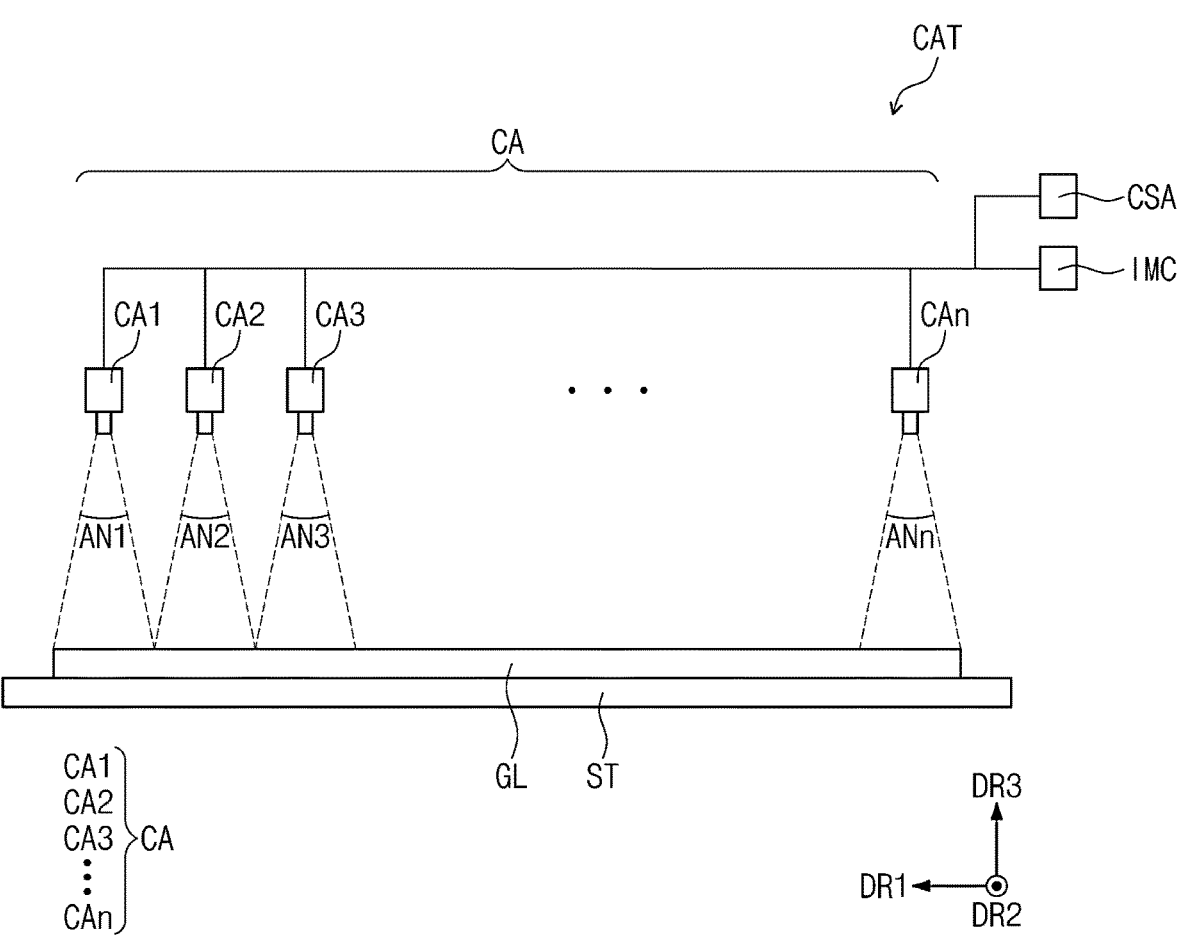
FIG. 1B is a front view of an inspection apparatus according to an embodiment of the invention.

FIG. 1A is a perspective view of an inspection apparatus according to an embodiment of the invention. FIG. 1B is a front view of an inspection apparatus according to an embodiment of the invention.

Referring to FIGS. 1A and 1B, an inspection apparatus CAT according to an embodiment of the invention may include a stage ST, a plurality of photographing units CA, an image processing unit IMC, and a control unit CSA. The inspection apparatus CAT may be one of various types of inspection apparatuses for determining defects of a display substrate GL. The inspection apparatus CAT may perform inspection for presence/absence of a short circuit of a pixel, presence/absence of fine particles, and the like.

It may be understood, by a person skilled in the art related to this embodiment, that a configuration of the inspection apparatus CAT is not limited to the configuration illustrated in FIG. 1A, and other universal components may further be included in the inspection apparatus CAT.

The stage ST may have a flat surface shape in parallel to a plane defined by a first direction DR1 and a second direction DR2. The display substrate GL, which is an inspection target, may be seated on the stage ST. The display substrate GL may include a plurality of cell regions CL (see FIG. 2A) and a boundary region NCL (see FIG. 2A) adjacent to the plurality of cell regions CL (see FIG. 2A). The stage ST may be provided with a transport device (not illustrated)

such as a conveyor belt that allows the display substrate GL to move in the second direction DR2.

The plurality of photographing units CA may photograph the display substrate GL. The plurality of photographing units CA may each photograph one region of the display substrate GL. The plurality of photographing units CA may separately photograph portions of the display substrate GL, respectively. An image of the entire display substrate GL may be obtained by merging the photographed images. Whether there are defects in pixels of the display substrate GL and whether there are fine particles may be checked by using the merged images of the entire display substrate GL. The plurality of photographing units CA may be optical equipment for detecting light which is reflected by the display substrate GL or emitted from the display substrate GL. For example, the plurality of photographing units CA may be implemented as image sensors such as cameras.

The plurality of photographing units CA may include first to n-th photographing units CA1 to CAn. The number of the plurality of photographing units illustrated in FIGS. 1A and 1B is an example, and may be changed. Here, n may be a natural number greater than or equal to 2. Since the photographing units CA are provided in plurality, an inspection time taken to inspect the display substrate GL may be reduced.

A first photographing unit CA1 may have a first angle of view AN1, a second photographing unit CA2 may have a second angle of view AN2, a third photographing unit CA3 may have a third angle of view AN3, and an n-th photographing unit CAn may have an n-th angle of view ANn. The plurality of photographing units CA may each adjust the angles of view independently. FIGS. 1A and 1B illustrate that the angles of view AN1 to ANn of the plurality of photographing units CA have the same angle altogether but the angles of view AN1 to ANn may have different values, respectively.

The plurality of photographing units CA may be arranged in the first direction DR1. The plurality of photographing units CA, which are arranged in the first direction DR1, may move in the second direction DR2 and photograph the display substrate GL. Accordingly, the images photographed by the plurality of photographing units CA may extend in the second direction DR2. However, as described above, when a transport device, which allows the display substrate GL on the stage ST to move in the second direction DR2, is provided, the positions of the plurality of photographing units CA may be fixed.

The image processing unit IMC may be connected to the plurality of photographing units CA to binarize the photographed images. Using the binarized images, boundaries of the plurality of cell regions CL (see FIG. 2) and the boundary region NCL (see FIG. 2) may be determined.

The control unit CSA may be connected to the plurality of photographing units CA, and may determine the plurality of cell regions CL (see FIG. 2) and the boundary region NCL (see FIG. 2) by using the images binarized in the image processing unit IMC. The control unit CSA may independently adjust the angles of view AN1 to ANn of the plurality of photographing units CA. The control unit CSA may adjust the angles of view AN1 to ANn of the plurality of photographing units CA so that boundaries BR1 to BRn of first to n-th photographing regions FO1 to FOn (see FIG. 2A) overlap the boundary region NCL (see FIG. 2) in a plan view. This will be described later with reference to FIG. 2A.

The control unit CSA may set an inspection region ROI (see FIG. 11) on the basis of an outermost location of each of the plurality of cell regions which are detected by using the binarized images. This will be described later with reference to FIG. 11.

In FIG. 1A and subsequent drawings, first to third directions DR1, DR2, and DR3 are illustrated, but the directions indicated by the first to third directions DR1, DR2, and DR3 illustrated in this specification may have a relative concept and may thus be changed to other directions.

In this specification, the first direction DR1 and the second direction DR2 may be perpendicular to each other, and a third direction DR3 may be a normal direction of the plane defined by the first direction DR1 and the second direction DR2.

Figure 2A:
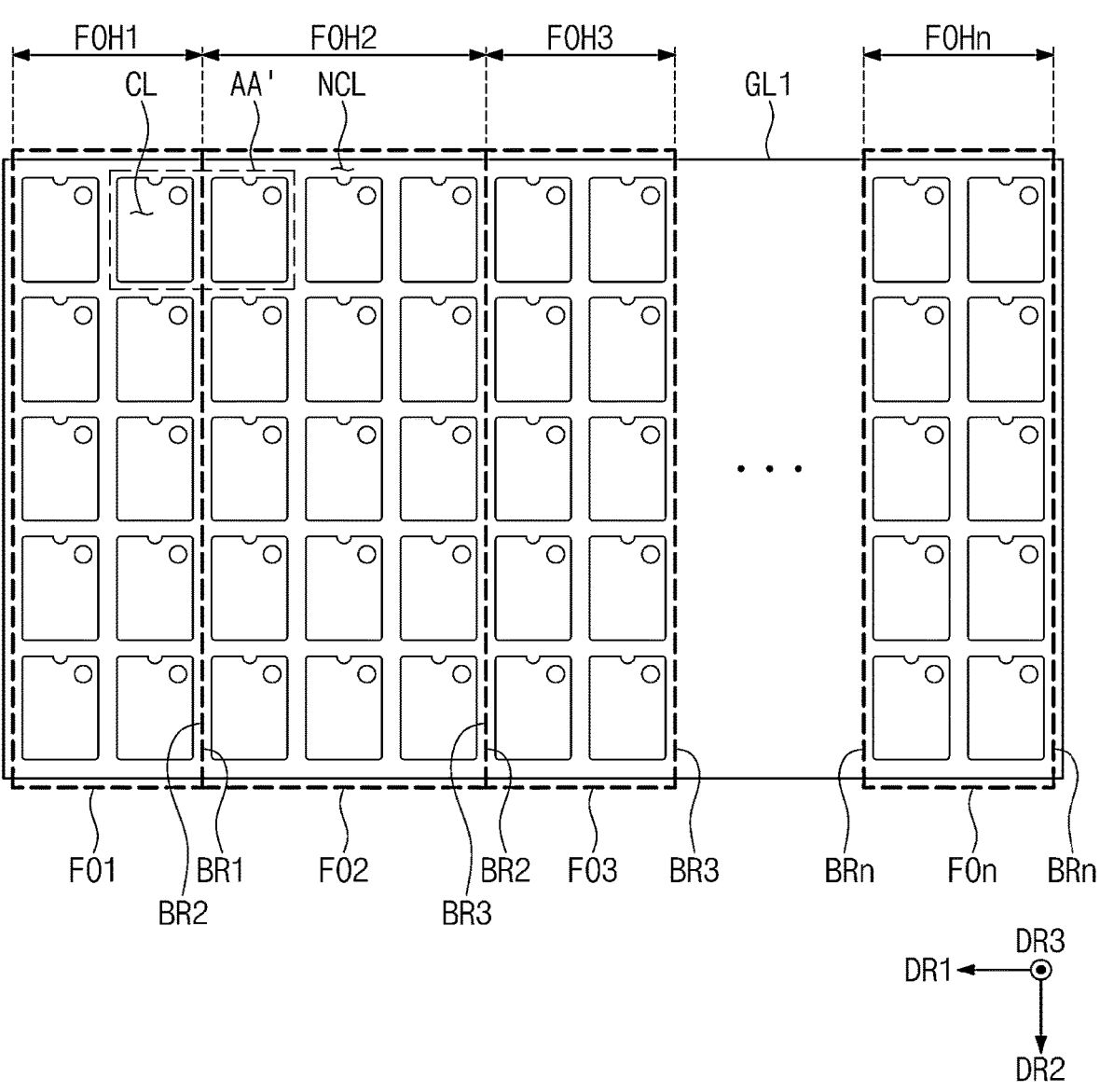
FIG. 2A is a plan view of a first display substrate according to an embodiment of the invention.

FIG. 2A is a plan view of a first display substrate according to an embodiment of the invention. FIG. 2A illustrates photographing regions FO1 to FOn photographed by the plurality of respective photographing units CA (see FIG. 1A) in FIG. 1A. As used herein, the "plan view" is a view in a thickness direction (i.e., the third direction DR3) of the display substrate.

Referring to FIGS. 1A and 2A, the first photographing unit CA1 may photograph a first photographing region FO1 of a first display substrate GL. The second photographing unit CA2 may photograph a second photographing region FO2 of the first display substrate GL. The third photographing unit CA3 may photograph a third photographing region FO3 of the first display substrate GL. The n-th photographing unit CAn may photograph an n-th photographing region FOn. The first to n-th photographing regions FO1 to FOn may be arranged along the first direction DR1. The second photographing region FO2 may be adjacent to the first photographing region FO1 in the first direction DR1.

FIG. 2A briefly illustrates that the first to n-th photographing regions FO1 to FOn do not overlap each other in a plan view. However, the first to n-th photographing regions FO1 to FOn may overlap each other in a plan view and may be arranged along the first direction DR1. This will be described later with reference to FIG. 2B.

The first to n-th photographing units CA1 to CAn may each adjust the first to n-th angles of view AN1 to ANn independently and thus adjust the first to n-th photographing regions FO1 to FOn independently. The first to n-th angles of view AN1 to ANn may be proportional to first to n-th widths FOH1 to FOHn of the first to n-th photographing regions FO1 to Fon, respectively. For example, when the first angle of view AN1 of the first photographing unit CA1 is adjusted to be smaller, the first width FOH1 of the first photographing region FO1 may become narrower. When the second angle of view AN2 of the second photographing unit CA2 is adjusted to be greater, the second width FOH2 of the second photographing region FO2 may become broader.

The first to n-th photographing regions FO1 to FOn may each extend in the second direction DR2. The first to n-th photographing regions FO1 to FOn may be regions photographed by the plurality of photographing units CA while the plurality of photographing units CA move in the second direction DR2, or the display substrate GL moves in the second direction DR2.

The first to n-th photographing regions FO1 to FOn may each cover a plurality of cell regions which are arranged in m or more columns. Here, m may be a natural number greater than 0. For example, the first photographing region FO1 may cover two columns of the plurality of cell regions CL arranged in the first direction DR1. The second photographing region FO2 may cover three columns of the plurality of cell regions CL arranged in the first direction DR1.

The first to n-th photographing regions FO1 to FOn may have the first to n-th widths FOH1 to FOHn in the first direction DR1, respectively. The first to n-th widths FOH1 to FOHn may be proportional to the angles of view AN1 to ANn of the plurality of photographing units CA, respectively. When the second width FOH2 is greater than the first width FOH1, as illustrated in FIG. 2A, the angle of view AN2 of the second photographing unit CA2 may be greater than the angle of view AN1 of the first photographing unit CA1, in FIG. 1A. Therefore, sizes (i.e., areas in a plan view) of the first to n-th photographing regions FO1 to Fon may be the same or different from each other. In FIG. 1A, the angles of view AN1 to ANn are measured in a plane defined by the first direction DR1 and the third direction DR3 as an example.

The first to n-th photographing regions FO1 to FOn may cover all the plurality of cell regions CL. A first boundary BR1 of the first photographing region FO1 may overlap a boundary region NCL in a plan view. A second boundary BR2 of the second photographing region FO2 may overlap the boundary region NCL in a plan view. A third boundary BR3 of the third photographing region FO3 may overlap the boundary region NCL in a plan view. A boundary BRn of the n-th photographing region FOn may overlap the boundary region NCL in a plan view. The first to n-th boundaries BR1 to BRn may not overlap the plurality of cell regions CL in a plan view.

When the first to n-th boundaries BR1 to BRn overlap the plurality of cell regions CL in a plan view, the first to n-th angles of view AN1 to ANn of the first to n-th photographing units CA1 to CAn may be adjusted. Accordingly, the first to n-th boundaries BR1 to BRn may be adjusted so that the first to n-th boundaries BR1 to BRn all overlap the boundary region NCL, and do not overlap the plurality of cell regions CL in a plan view.

Figure 2B:
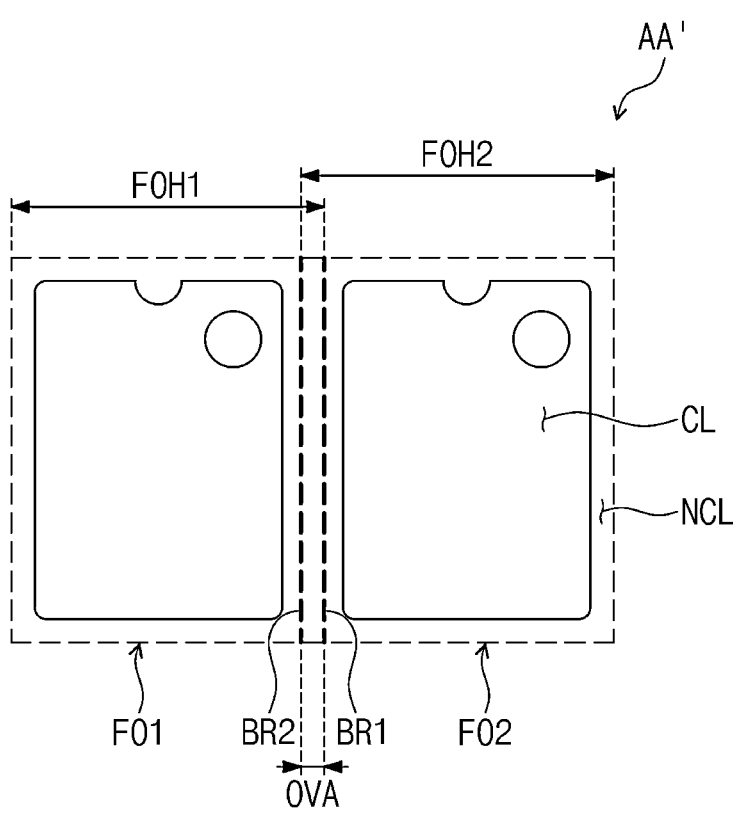
FIG. 2B is an enlarged plan view illustrating a region AA' of FIG. 2A according to an embodiment of the invention.

FIG. 2B is an enlarged plan view illustrating a region AA' of FIG. 2A according to an embodiment of the invention. FIG. 2B illustrates a first boundary BR1 of a first photographing region FO1 and a second boundary BR2 of a second photographing region FO2 only, but contents described with reference to FIG. 2B may all be applied to the first to n-th boundaries BR1 to BRn (see FIG. 2A) of the first to n-th photographing regions FO1 to FOn (see FIG. 2A).

Referring to FIGS. 2A and 2B, the first photographing region FO1 and the second photographing region FO2 may overlap each other in the boundary region NCL in a plan view. One right-side region of the first photographing region FO1 may overlap one left-side region of the second photographing region FO2 in a plan view. An overlapping region OVA located between the first boundary BR1 of the first photographing region FO1 and the second boundary BR2, adjacent to the first boundary BR1, of the second photographing region FO2 may overlap the boundary region NCL and may not overlap the plurality of cell regions CL in a plan view. As will be described later, the overlapping region OVA corresponds to a region in which a shading difference between images occurs during merge of a plurality of images and may thus be viewed as a stain.

Since the overlapping region OVA overlaps the boundary region NCL and does not overlap the plurality of cell regions CL in a plan view, the cell regions CL may be prevented from being detected as a defect despite no defect in the cell regions CL due to a stain which may be viewed in the overlapping region OVA. Accordingly, the reliability in defect determination of the display substrate GL (see FIG. 1A) may be effectively improved.

Figure 2C:
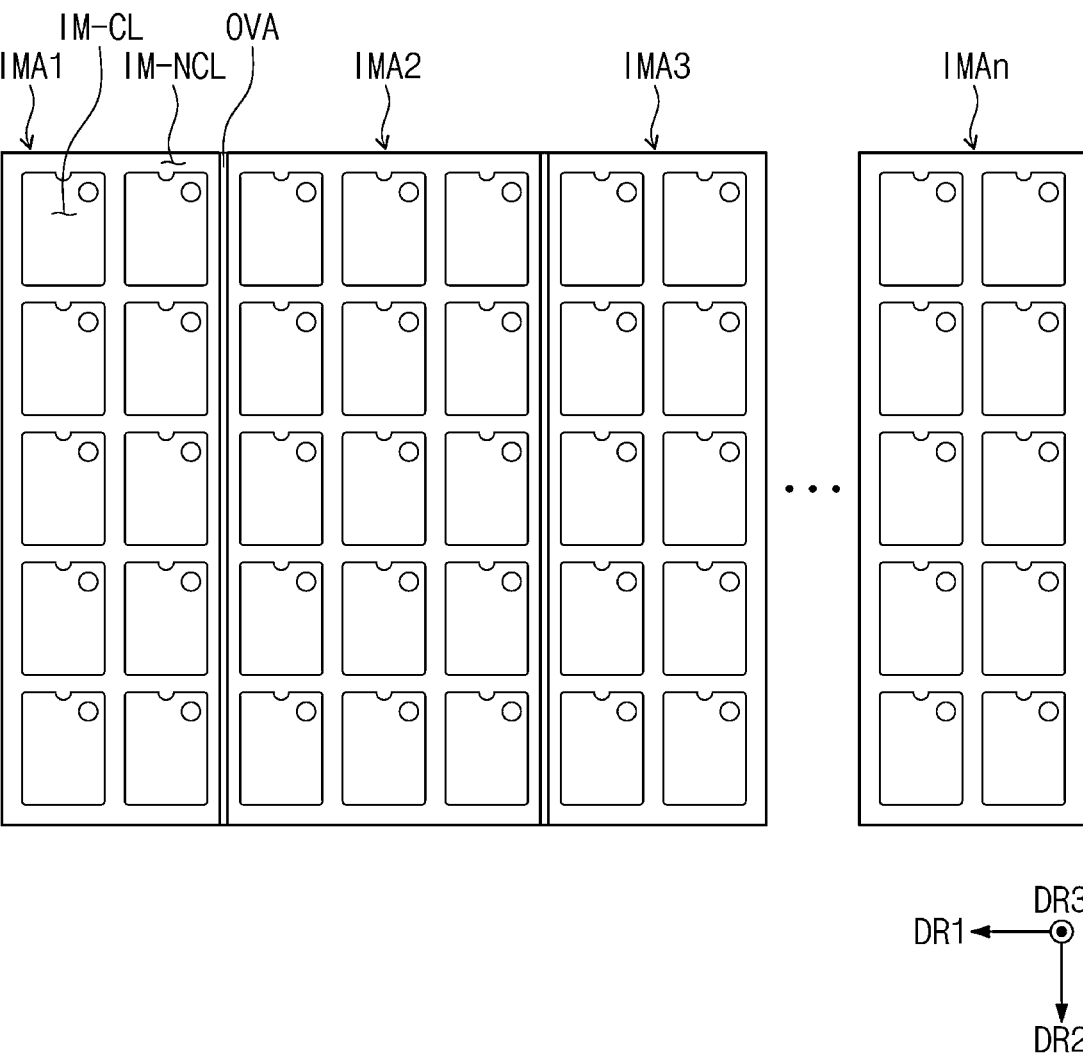
FIG. 2C illustrates photographed images according to an embodiment of the invention.

FIG. 2C illustrates photographed images according to an embodiment of the invention. FIG. 2C illustrates first to n-th images IMA1 to IMAn photographed by the first to n-th photographing units CA1 to CAn, respectively (see FIG. 1A).

Referring to FIG. 2C, the first to n-th images IMA1 to IMAn, which are photographed by the first to n-th photographing units CA1 to CAn (see FIG. 1A), may be arranged to partially overlap each other in a plan view and then may be merged along the first direction DR1. That is, the first to n-th photographing units CA1 to CAn (see FIG. 1A) may separately photograph portions of the display substrate GL (see FIG. 1A), respectively and may merge the photographed images. Accordingly, an optical inspection image of the entire display substrate GL (see FIG. 1A) may be formed.

One right-side region of a first image IMA1 may overlap one left-side region in a plan view, adjacent to the first image IMA1, of a second image IMA2, and thus an overlapping region OVA may be formed. One right-side region of the second image IMA2 may overlap one left-side region, adjacent to the second image IMA2, of a third image IMA3, and thus an overlapping region OVA may be formed. Overlapping regions OVA may be located between two adjacent images among the plurality of first to n-th images IMA1 to IMAn.

In the overlapping region OVA, a stain extending in the second direction DR2 may be formed due to a brightness difference caused by two images overlapping with each other in a plan view. When such a stain overlaps a cell region CL in a plan view, a defect may be perceived despite no defect in the cell, and inspection consistency may be reduced, thereby reducing inspection reliability. Hence, the overlapping region OVA is disposed to overlap a boundary region NCL and not to overlap the cell regions CL in a plan view, and thus inspection reliability may be effectively improved.

Figure 3:
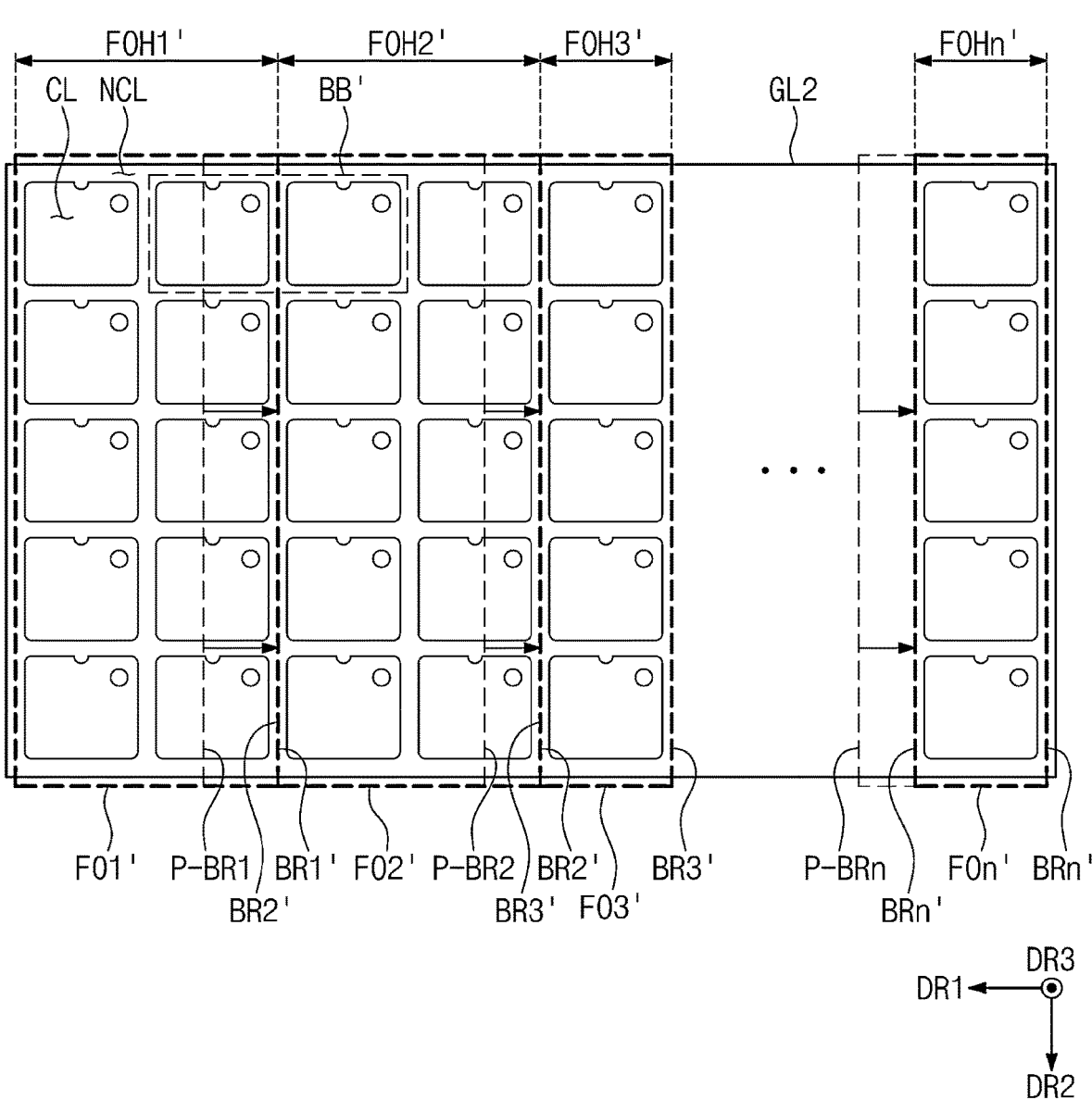
FIG. 3 is a plan view of a second display substrate according to an embodiment of the invention.

FIG. 3 is a plan view of a second display substrate according to an embodiment of the invention. Hereinafter, the same components as those described with reference to FIGS. 1A to 2C will be denoted as the same reference numerals or symbols, and description thereof will be omitted.

Referring to FIG. 3, first to n-th photographing regions FO1' to FOn' may be changed depending on an arrangement of a plurality of cell regions CL of a display substrate. The first to n-th photographing regions FO1' to FOn' may be changed so that boundaries BR1' to BRn' of the first to n-th photographing regions FO1' to FOn' may each overlap a boundary region NCL and may not overlap the plurality of cell regions CL in a plan view. First to n-th widths FOH1' to FOHn' may also be changed accordingly. Such a change may be achieved by adjusting the angles of view AN1 to ANn (see FIG. 1A) of the first to n-th photographing units CA1 to CAn (see FIG. 1A), respectively.

Referring to FIGS. 2A and 3, an arrangement of the plurality of cell regions CL of the first display substrate GL1 may be different from an arrangement of the plurality of cell regions CL of the second display substrate GL2. Accordingly, the first to n-th photographing regions FO1 to FOn (see FIG. 2A) in FIG. 2A during inspection of the first display substrate GL1 may be changed to the first to n-th photographing regions FO1' to FOn' (see FIG. 3) during inspection of the second display substrate GL2.

Referring to FIG. 3, during inspection of the second display substrate GL2, the existing first boundary P-BR1 may move in an opposite direction of the first direction DR1 to be located in a first boundary BR1'. The existing second boundary P-BR2 may move in the opposite direction of the first direction DR1 to be located in a second boundary BR2'. The existing n-th boundary P-BRn may move in the opposite direction of the first direction DR1 to be located in an n-th boundary BRn'. The first to n-th boundaries BR1' to BRn' may overlap the boundary region NCL and may not overlap the plurality of cell regions CL in a plan view. Thus, the first to n-th photographing regions FO1' to FOn' may be changed depending on the arrangement of the cell regions CL of the display substrate GL2 which is the inspection target.

Figure 4:
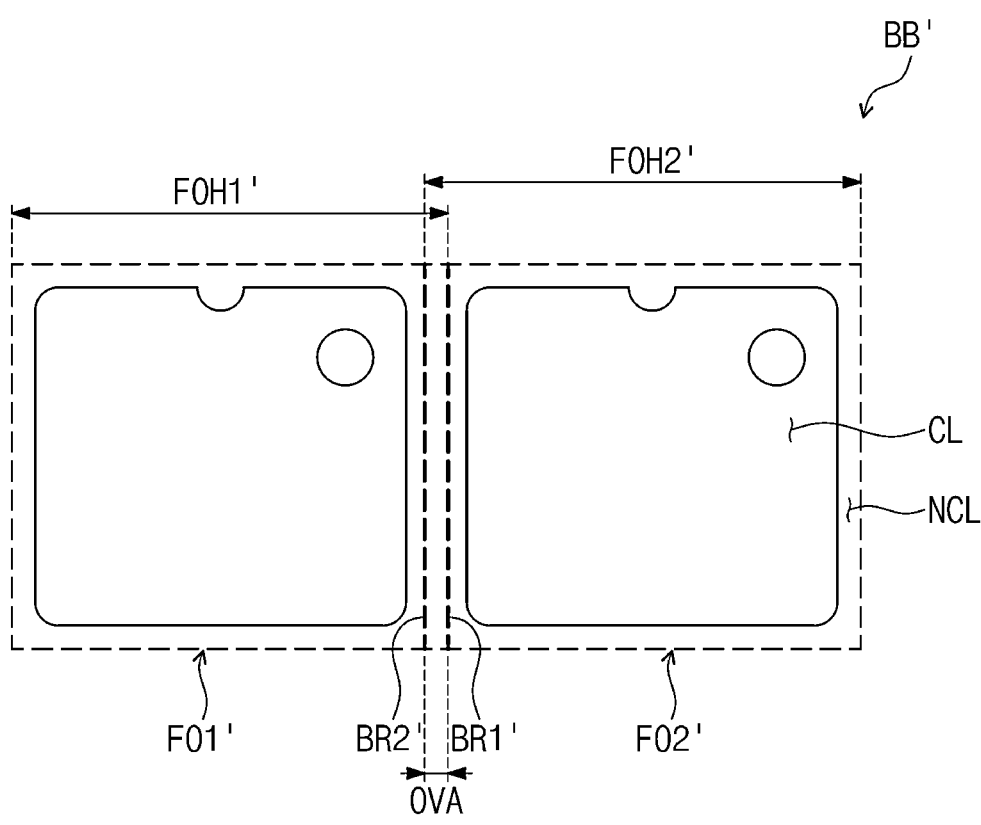
FIG. 4 is an enlarged plan view illustrating a region BB' of FIG. 3 according to an embodiment of the invention.

FIG. 4 is an enlarged plan view illustrating a region BB' of FIG. 3 according to an embodiment of the invention. FIG. 4 illustrates a first boundary BR1' of a first photographing region FO1' and a second boundary BR2' of a second photographing region FO2' only, but contents described with reference to FIG. 4 may all be applied to the first to n-th boundaries BR1' to BRn' (see FIG. 4) of the first to n-th photographing regions FO1' to FOn' (see FIG. 3).

Referring to FIGS. 3 and 4, the first photographing region FO1' and the second photographing region FO2' may overlap each other in an overlapping region OVA in a plan view. One right-side region of the first photographing region FO1' may overlap one left-side region of the second photographing region FO2' in a plan view. The overlapping region OVA located between the first boundary BR1' of the first photographing region FO1' and the second boundary BR2', adjacent to the first boundary BR1', of the second photographing region FO2' may overlap the boundary region NCL and may not overlap the plurality of cell regions CL in a plan view.

FIG. 5 is a flowchart of a method of inspecting a display substate according to an embodiment of the invention.

Referring to FIG. 5, a method of inspecting a display substrate may include a step of photographing a display substrate having a plurality of cells (S100), a step of checking a boundary coordinate of a photographing region for each photographing unit (S200), a step of binarizing an image of the photographed display substrate (S300), a step of confirming a location of a boundary region between cells by using the binarized image (S400), a step of adjusting an angle of view of the photographing unit so that a boundary of the photographing region overlaps the boundary region between the cells in a plan view (S500), a step of setting inspection regions respectively corresponding to a plurality of cell regions by using the binarized image (S600), and a step of merging the plurality of images photographed by the plurality of photographing units (S700). Hereinafter, each step will be described below with reference to FIGS. 6 to 11.

Figure 6:
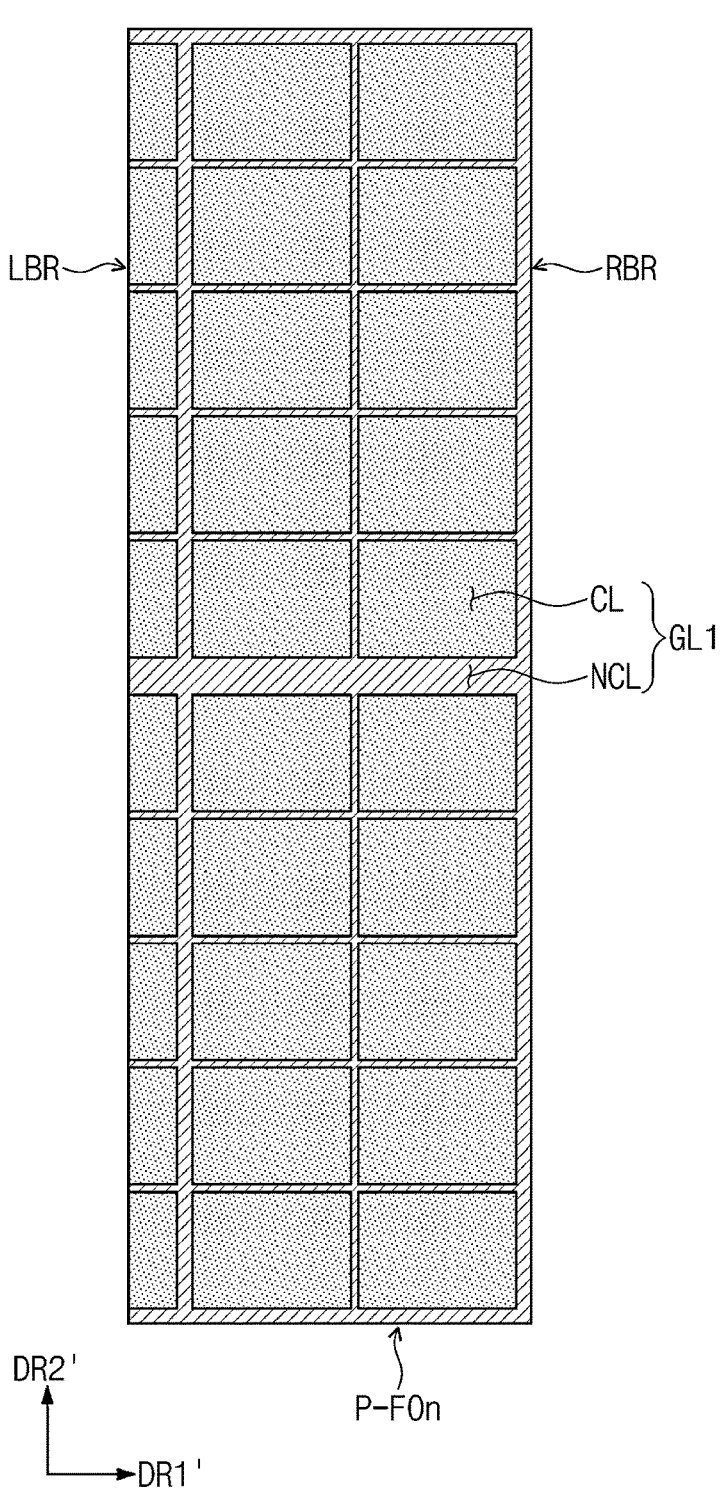
FIG. 6 is a plan view of an image photographed in an n-th preliminary photographing region according to an embodiment of the invention.

FIG. 6 is a plan view of an image photographed in a first preliminary photographing region according to an embodiment of the invention. FIG. 6 only illustrates an image photographed by the n-th photographing unit CAn (see FIG. 1A) among the plurality of photographing units CA (see FIG. 1A) in FIG. 1A. FIG. 6 exemplarily illustrates an n-th photographing region FOn only, but the plurality of photographing units CA (see FIG. 1A) in FIG. 1A may all photograph a display substrate GL1.

Referring to FIGS. 1A and 6, the n-th photographing unit CAn may photograph an n-th preliminary photographing region P-FOn of a first display substrate GL1. Since the n-th preliminary photographing region P-FOn is in a state before the boundary thereof is adjusted, the boundary of the n-th preliminary photographing region P-FOn may overlap a plurality of cell regions CL in a plan view. As illustrated in FIG. 6, a left boundary LBR of the n-th preliminary photographing region P-FOn may overlap the plurality of cell regions CL in a plan view. Although not illustrated, a right boundary RBR of the n-th preliminary photographing region P-FOn may also overlap the plurality of cell regions CL in a plan view.

Figure 7:
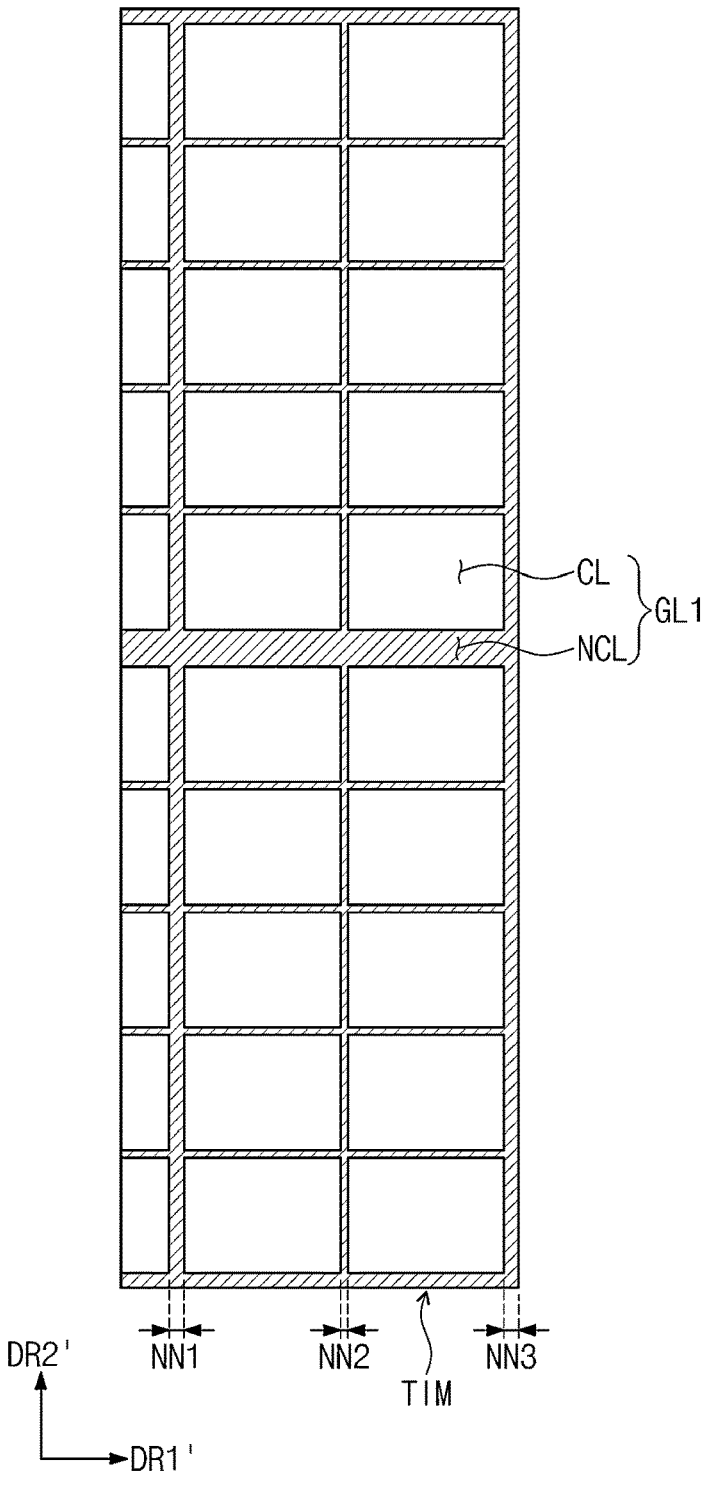
FIG. 7 is a plan view illustrating a binarization of an image photographed in an n-th preliminary photographing region according to an embodiment of the invention.

FIG. 7 is a plan view illustrating a binarization of an image photographed in an n-th preliminary photographing region according to an embodiment of the invention.

Referring to FIG. 7, photographed images of the n-th preliminary photographing region P-FOn (see FIG. 6) may be binarized, and thus binarized images TIM may be formed. Bright pixels having a brightness higher than a threshold value, among pixels of the photographed images in the n-th preliminary photographing region P-FOn (see FIG. 6), may all be represented as a first color. Dark pixels having a brightness lower than the threshold value, among the pixels of the photographed images in the n-th preliminary photographing region P-FOn (see FIG. 6), may all be represented as a second color which is different from the first color. In the binarized images TIM as in FIG. 7, a plurality of cell regions CL may be represented as white, which is the first color, and a boundary region NCL may be represented as black, which is the second color.

By binarizing the images as such, locations of the plurality of cell regions CL and the boundary region NCL may be confirmed.

Figure 8:
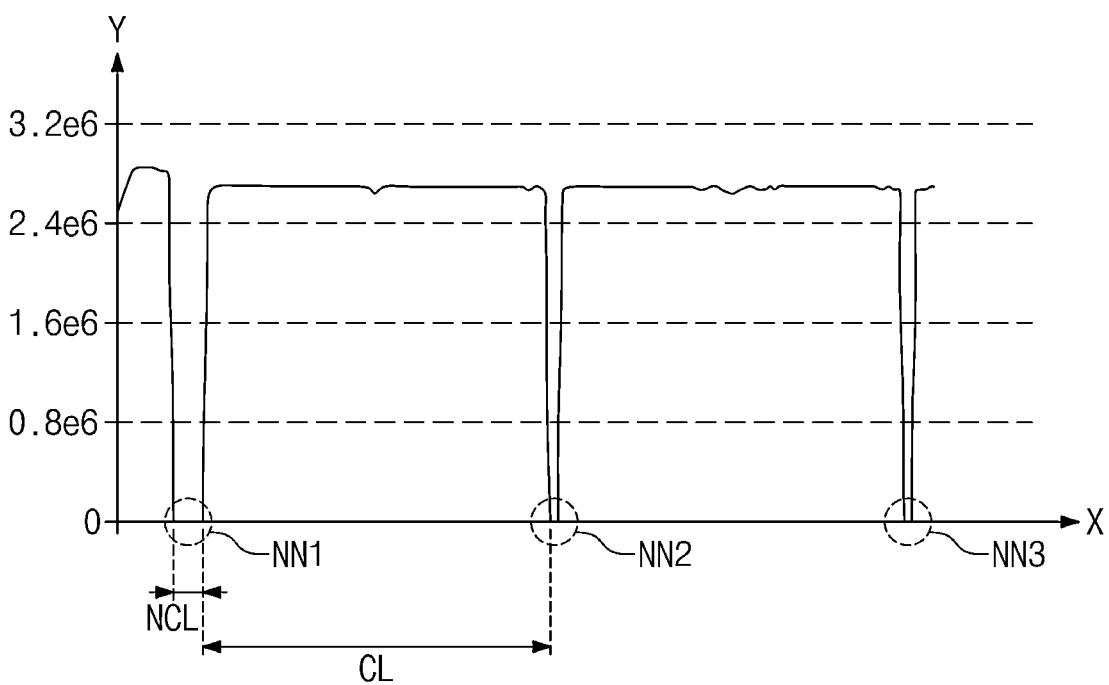
FIG. 8 is a graph showing brightness of each location in a first direction according to an embodiment of the invention.

FIG. 8 is a graph showing brightness of each location in a first direction according to an embodiment of the invention. An X-axis in FIG. 8 indicates locations in the first direction DR1' of FIG. 7, and a Y-axis indicates a sum of brightness data of corresponding pixels in the first direction DR1'. The Y-axis indicates the sum of data values when the brightness of each of the pixels corresponding to the locations in the first direction DR1' is represented with 8 bits (0-255).

Referring to FIG. 8, the cell regions CL and the boundary region NCL may be distinguished since the images in FIG. 7 have been binarized. A first point NN1, a second point NN2, and a third point NN3, at which a value of the Y-axis is close to about 0, may correspond to the locations of the boundary region NCL in the first direction DR1' (see FIG. 7). The first to third points NN1 to NN3 may correspond to the first to third points NN1 to NN3 in FIG. 7, respectively. The other regions, in which values of the Y-axis are not 0, may correspond to the plurality of cell regions CL.

Figure 9:
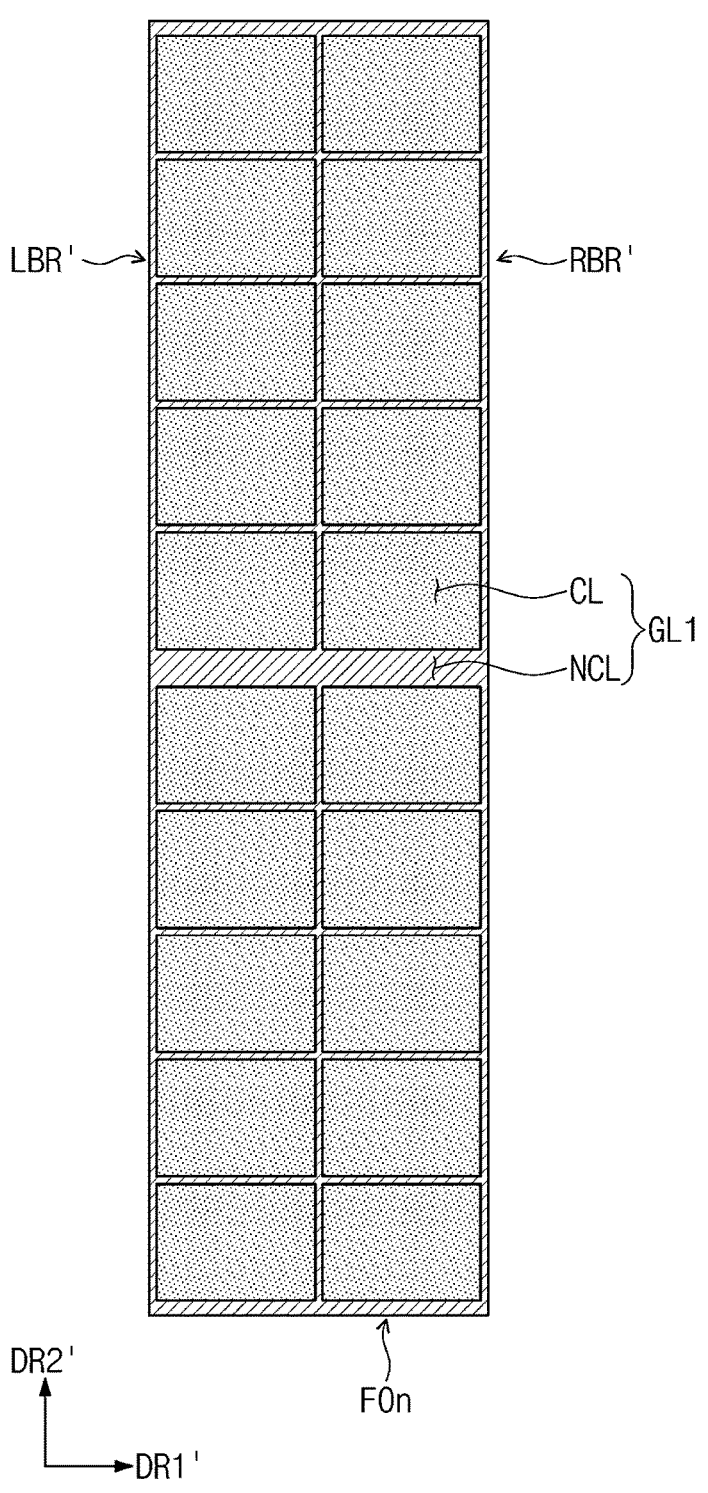
FIG. 9 is a plan view illustrating a boundary of a changed n-th photographing region according to an embodiment of the invention.

FIG. 9 is a plan view illustrating a boundary of a changed n-th photographing region according to an embodiment of the invention. Contents described with reference to FIG. 9 may all be applied to the first to n-th photographing regions FO1 to FOn (see FIG. 2) and the first to n-th photographing units CA1 to CAn (see FIG. 1A).

Referring to FIGS. 1A and 9, the n-th angle of view ANn of the n-th photographing unit CAn may be adjusted so that both a left boundary LBR' and a right boundary RBR', of the n-th photographing region FOn, overlap a boundary region NCL in a plan view. The n-th angle of view ANn may be adjusted so that the left boundary LBR' is located on the first point NN1 (see FIG. 8) in FIG. 8, and the right boundary RBR' is located on the third point NN3 (see FIG. 8) in FIG. 8. Accordingly, the boundaries LBR' and RBR' of the n-th photographing region FOn may not overlap a plurality of cell regions CL and may overlap the boundary region NCL in a plan view.

Figure 10:
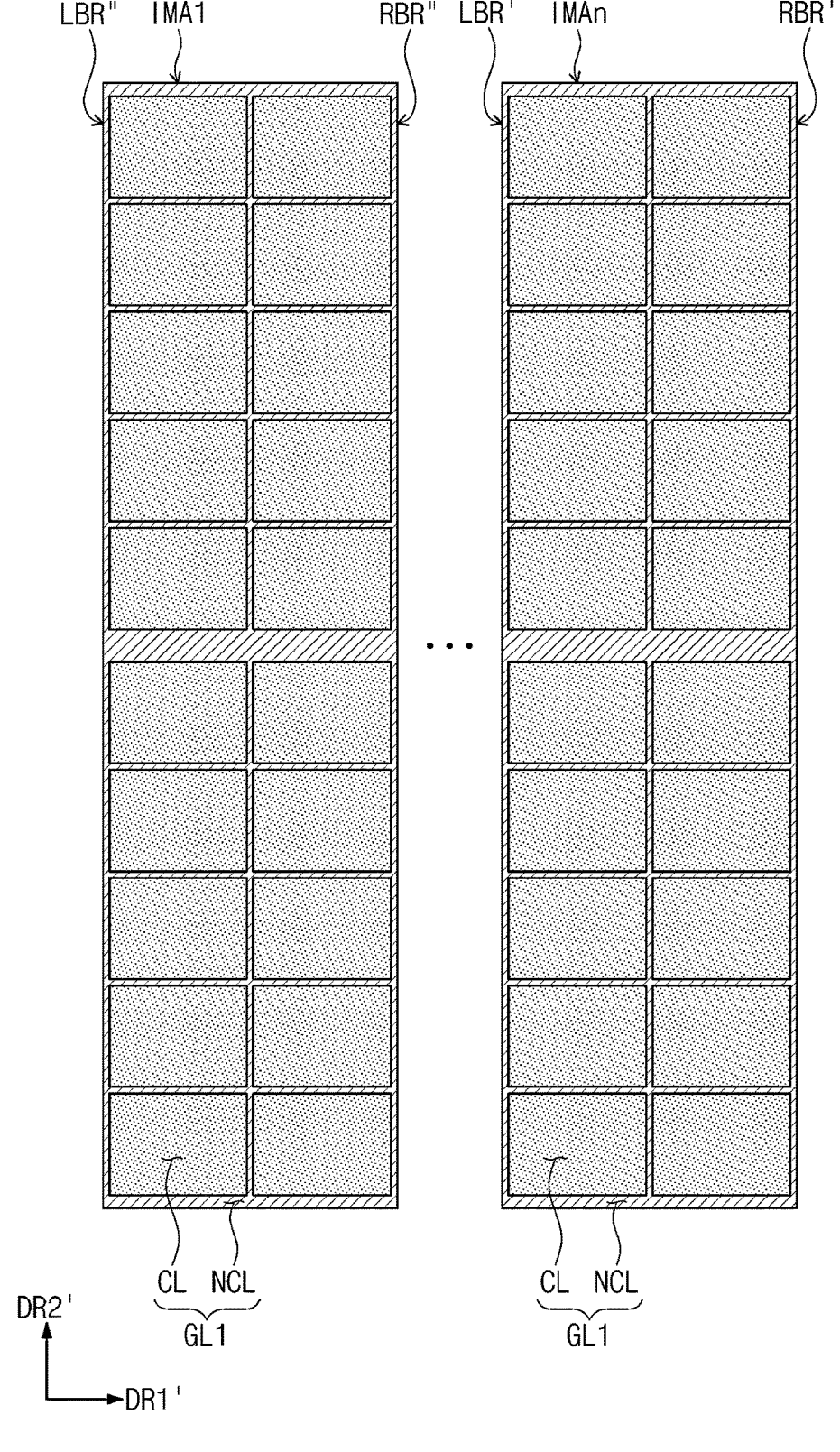
FIG. 10 is a plan view illustrating images photographed by a plurality of photographing units according to an embodiment of the invention.

FIG. 10 is a plan view illustrating images photographed by a plurality of photographing units according to an embodiment of the invention.

Referring to FIGS. 1A and 10, a plurality of images IMA1 to IMAn photographed by the plurality of photographing units CA may be merged. The plurality of images IMA1 to IMAn, photographed by the plurality of photographing units CA, may be merged to overlap each other in a plan view in the boundary region NCL. Since the merged shape of the plurality of images IMA1 to IMAn has been explained with reference to FIG. 2C, a detailed description thereof will be omitted.

Figure 11:
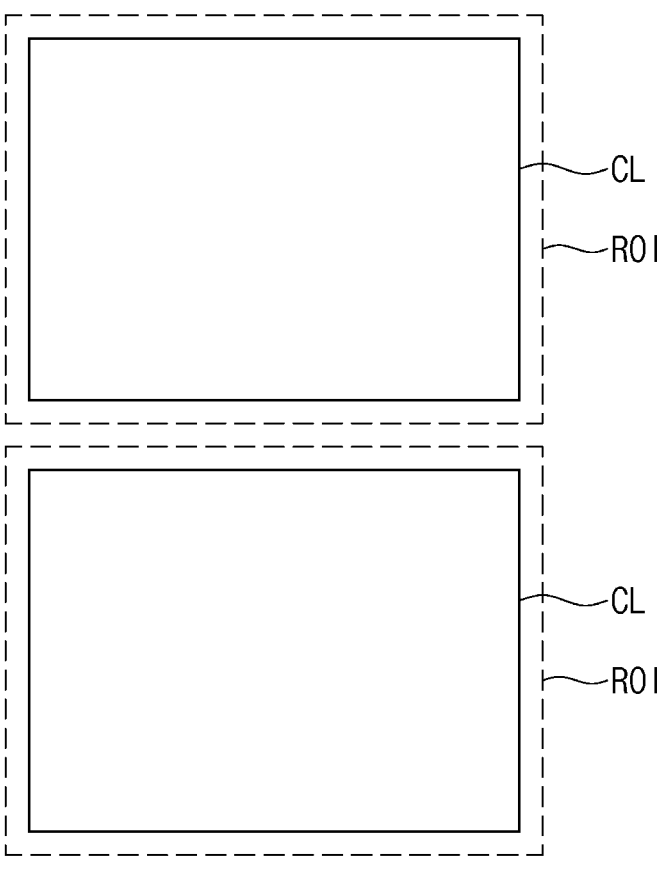
FIG. 11 is a plan view illustrating a cell region and an inspection region according to an embodiment of the invention.

FIG. 11 is a plan view illustrating a cell region and an inspection region according to an embodiment of the invention.

Referring to FIGS. 7 and 11, an inspection region ROI may be set on the basis of an outermost location of each of the plurality of cell regions CL by using the binarized image TIM. The inspection region ROI may cover each of the cell regions CL. The inspection region ROI may be located further outside than the outermost location of each of the plurality of cell regions CL.

In an inspection apparatus and a method of inspecting a display substrate according to an embodiment of the invention, boundaries of first and second photographing regions are disposed in a boundary region to prevent a shading difference caused by merging images from occurring in a cell region, thereby improving the reliability in defect determination.

As used in connection with various embodiments of the disclosure, each of the control unit CSA and the image processing unit IMC may be implemented in hardware, software, or firmware, for example, implemented in a form of an application-specific integrated circuit ("ASIC"), a microprocessor, or a graphics processing unit ("GPU").

In the above, description has been made with reference to preferred embodiments of the invention, but those skilled in the art or those of ordinary skill in the relevant technical field may understand that various modifications and changes may be made to the invention within the scope not departing from the spirit and the technology scope of the invention described in the claims to be described later. Therefore, the technical scope of the invention is not limited to the contents described in the detailed description of the specification, but should be determined by the claims.

What is claimed is:

1. An inspection apparatus comprising:
a stage on which a display substrate including a plurality of cell regions and a boundary region adjacent to the plurality of cell regions is seated; and
a plurality of photographing units configured to photograph the display substrate,
wherein the plurality of photographing units includes a first photographing unit configured to photograph a first photographing region of the display substrate, and a second photographing unit configured to photograph a second photographing region adjacent to the first photographing region of the display substrate,
the first photographing unit is capable of independently adjusting the first photographing region and the second photographing unit is capable of independently adjusting the second photographing region, and
a boundary of the first photographing region and a boundary of the second photographing region overlap the boundary region in a plan view,
wherein a size of the first photographing region is different from a size of the second photographing region.

2. The inspection apparatus of claim 1, wherein the boundary of the first photographing region and the boundary of the second photographing region do not overlap the plurality of cell regions in the plan view.

3. The inspection apparatus of claim 1, wherein the first photographing region and the second photographing region are changed depending on an arrangement of the plurality of cell regions of the display substrate.

4. The inspection apparatus of claim 1, wherein the plurality of photographing units is arranged in a first direction, and
the first photographing region and the second photographing region each extend in a second direction crossing the first direction.

5. The inspection apparatus of claim 4, wherein the plurality of photographing units are configured to move along the second direction.

6. The inspection apparatus of claim 4, wherein the display substrate is configured to move along the second direction.

7. The inspection apparatus of claim 1, further comprising an image processing unit connected to the plurality of photographing units to binarize a photographed image.

8. The inspection apparatus of claim 7, further comprising a control unit connected to the plurality of photographing units, and configured to determine the boundary region by using the binarized image and adjust angles of view of the plurality of photographing units such that the boundaries of the first and the second photographing regions each overlap the boundary region in the plan view.

9. The inspection apparatus of claim 1, wherein the first photographing region and the second photographing region overlap each other in the boundary region in the plan view.

10. The inspection apparatus of claim 8, wherein the control unit is configured to use the binarized image to set an inspection region based on an outermost location of each of the plurality of cell regions which are detected.

11. A method of inspecting a display substrate, the method comprising:
photographing, by a plurality of photographing units, the display substrate including a plurality of cell regions and a boundary region adjacent to the plurality of cell regions;
binarizing an image of the photographed display substrate;
confirming a location of the boundary region between the plurality of cell regions by using the binarized image; and
adjusting an angle of view of each of the plurality of photographing units such that boundaries of photographing regions photographed by the plurality of photographing units each overlap the boundary region in a plan view.

12. The method of claim 11, wherein the plurality of photographing units comprises a first photographing unit configured to photograph a first photographing region of the display substrate, and a second photographing unit configured to photograph a second photographing region adjacent to the first photographing region of the display substrate, and
the first photographing unit is capable of independently adjusting the first photographing region and the second photographing unit is independently adjusting the second photographing region.

13. The method of claim 11, wherein the boundaries of the photographing regions do not overlap the plurality of cell regions in the plan view.

14. The method of claim 11, wherein the plurality of photographing units are arranged in a first direction,
the plurality of photographing units move in a second direction crossing the first direction, the display substrate moves in the second direction, and the plurality of photographing units photograph the display substrate.

15. The method of claim 11, wherein in the binarizing of the image of the photographed display substrate, bright pixels having a brightness higher than a threshold value, among pixels of the image of the display substrate, are all represented as a first color, and dark pixels having a brightness lower than the threshold value, among the pixels of the image of the display substrate, are represented as a second color which is different from the first color.

16. The method of claim 11, further comprising setting, by using the binarized image, an inspection region based on an outermost location of each of the plurality of cell regions which are detected.

17. The method of claim 11, further comprising merging a plurality of images which are photographed by the plurality of photographing units.

18. The method of claim 17, wherein the plurality of images overlap each other in the boundary region in the plan view.

19. The method of claim 11, wherein each of the photographing regions of the plurality of photographing units is changed depending on an arrangement of the plurality of cell regions of the display substrate.

\*  \*  \*  \*  \*